Patented Feb. 1, 1949

2,460,536

UNITED STATES PATENT OFFICE 2,460,536

REACTION BETWEEN VINYL CYANIDE AND REACTIVE METHYLENE COMPOUNDS

Arthur O. Rogers, Lewiston, N. Y., assignor to E. I. du Pont de Nemours & Company, Wilmington, Del., a corporation of Delaware No Drawing. Application July 18, 1946,
Serial No. 684,539

4 Claims. (Cl. 260—465)

This invention relates to a new and improved method of reacting vinyl cyanide with compounds containing a reactive methylene group. More particularly, it relates to a method of reacting vinyl cyanide with a compound containing a reactive methylene group which will favor the production of products in which only one molecule of vinyl cyanide is combined with the said reactive group.

By the term "reactive methylene group" is meant a methylene group in which the hydrogen is rendered reactive by direct connection to an adjacent unsaturated carbon atom, for example, by direct connection to an unsaturated carbon atom of a

—C≡N group, or, to a lesser extent, to a —C=C—, a —C≡C—, or an unsaturated carbon atom of an aryl group. In general, active methylene compounds contain two such radicals attached directly to the —CH₂— group. This compound should not have more than one aryl group as the activating group for the methylene radical. As examples of such compounds, the following may be named: acetylacetone, acetoacetic esters, for example, the methyl and ethyl esters of acetoacetic acid; benzyl cyanide, cyanoacetic esters, for example, the methyl and ethyl esters of cyanoacetic acid; malononitrile, phenyl acetic esters, for example, the methyl and ethyl esters of phenyl acetic acid; malonic esters, for example, ethyl malonate, cyanoacetamide. By compounds having a reactive methylene group is, therefore, meant compounds containing a group of the general formula

X—CH₂—Y in which X represents a radical taken from the class consisting of

—C≡N, —C=C—, —C≡C—, and aryl; and Y represents a radical taken from the class consisting of

and —C≡N.

It has been proposed, heretofore, to react vinyl cyanide with a compound containing a reactive methylene group. For example, it has been proposed to produce functional derivatives of disubstituted pimelic acid dinitriles by reacting vinyl cyanide with a functional derivative of a carboxylic acid which contains, in the alpha-position to the modified carboxylic acid group, a reactive CH₂ group, in the presence of an alkaline catalyst.

Heretofore, however, such reactions were always carried out under temperature conditions which inherently favored the addition of two vinyl cyanide groups to the reactive methylene group. Even when the two reactants were brought together in approximately equimolecular amounts, or with the reactive methylene compound in excess, mono-addition products were only produced in very minor amounts.

It is an object of this invention to provide a method for reacting vinyl cyanide with a compound having a reactive methylene group in such a manner as to enhance and favor the combination of only one vinyl cyanide molecule with the reactive methylene group of said compound.

It is another object of this invention to provide a method for the production in good yield of butyronitriles substituted in the gamma position by two negative radicals taken from the group consisting of

—C≡N, —C=C—, —C≡C—, and aryl, but not to exceed one —C=C—, —C≡C—, or aryl radical.

Other objects of the invention will appear hereinafter.

The objects of this invention may be accomplished, in general, by reacting vinyl cyanide with a compound containing a reactive methylene group at a temperature between 150° C. and 250° C. and in the presence of an alkaline catalyst. It has been found that if the above-mentioned reaction is carried out at a temperature between 150° C. and 250° C. the production of mono-addition products, i. e., products in which only one molecule of vinyl cyanide has combined with the reactive methylene group is greatly enhanced. Under these temperature conditions, the mono-addition products are produced in much greater amounts, usually in predominating amounts, and in some cases to the substantial exclusion of products in which two vinyl cyanide molecules are added to the methylene group.

As alkaline materials for catalyzing the reaction there may be used any of the usual alkaline catalysts, for example, oxides, hydroxides, cyanides, amides, hydrides, or alcoholates of the alkali metals, the alkali metals themselves, alkaline earth metal hydroxides or quaternary ammonium hydroxides, for example, sodium and potassium hydroxide, sodium oxide, sodium cyanide, sodium amide, sodium methylate, potassium ethylate, barium hydroxide, tetramethyl ammonium hydroxide, etc.

The temperature range of 150° C. to 250° C. is critical since a temperature of at least 150° C. is necessary to favor the production of the mono-addition product and diminish the production of the bis-addition product, and the temperature must not exceed 250° C. to avoid decomposition of the materials involved. When the reactive methylene compound used boils within the temperature range of 150° C. to 250° C., it is preferably heated to a temperature slightly below its boiling point, the basic catalyst added, and the vinyl cyanide then added gradually at such a rate that the boiling point of the reaction mixture is not materially lowered. However, if it is desired to use a temperature above the boiling point of the reactive methylene compound, the reaction may be carried out under sufficient pressure in a pressure vessel to prevent boiling of the said compound. It is preferred to add the vinyl cyanide gradually during the course of the reaction to avoid depressing the boiling point of the mixture, and also in order to maintain an excess of the reactive methylene compound. However, if desired, both reactants may be fed simultaneously into a pressure vessel maintained at the desired pressure and reaction temperature. Generally, it is preferred to use an excess of the reactive methylene compound, although good yields may be obtained without such excess. By "excess" is meant excess based on molecular weights of the vinyl cyanide and reactive methylene compound present. Inert diluents may be present, if desired; however, they are not essential for effecting the reaction. When operating at atmospheric pressure, any material which will lower the boiling point of the mixture and hence the reaction temperature is preferably excluded. Combination between the vinyl cyanide and the reactive methylene group takes place rapidly, and the resulting mixture contains a large proportion of the mono-addition product. The bis-addition product may also be present, the proportion thereof being greater the lower the temperature.

The following detailed examples are given to illustrate specifically certain preferred processes for carrying out the present invention, it being understood that the invention is not to be limited to the specific details set forth therein.

*Example I*

Two hundred and ninety-two (292) grams of benzyl cyanide (2.5 moles) was placed in a flask fitted with a reflux condenser, an agitator, and a dropping funnel. Approximately one gram of sodium cyanide and three drops of water were added, and the charge heated to 225° C. Twenty-six and one-half (26.5) grams of vinyl cyanide (0.5 mole) was added drop-wise while the temperature was maintained at 225° C.; additional sodium cyanide being added periodically to maintain the reaction. The reaction mixture was maintained at a temperature of 225° C. for one-half hour after the addition was complete. Fractionation under reduced pressure gave 68.3 grams (80% of theoretical yield) of alpha-phenyl glutaronitrile, boiling at 163° C./1 mm. The latter was identified by conversion to alpha-phenyl glutaric anhydride, melting point 94–95° C.

In similar experiments at 135° C. and 150° C., the following results were obtained: at 135° C., yield of alpha-phenyl glutaro nitrile, 11%; of gamma-cyano-gamma-phenyl pimelonitrile, 68%; at 150° C., yield of alpha-phenyl glutaronitrile, 34%; of gamma-cyano-gamma-phenyl pimelonitrile, 47%.

*Example II*

Following the method of Example I, 0.5 mole of ethyl cyanoacetate and 0.5 mole of vinyl cyanide were caused to react in the presence of a trace of sodium cyanide at a temperature between 150° C. and 165° C. Fractionation under reduced pressure yielded 14 grams of unreacted ethyl cyanoacetate, 24.5 grams of alpha-carbethoxyglutaronitrile and 14 grams of ethyl-bis-(beta-cyanoethyl) cyanoacetate.

A similar reaction at 40° C., using 1.2 moles of ethyl cyanoacetate and 0.5 mole of vinyl cyanide gave 93% of the theoretical yield of ethyl-bis-(beta-cyanoethyl)-cyanoacetate and no alpha-carbethoxy glutaronitrile.

The nitriles formed by the process of the present invention may be used directly as solvents, plasticizers, etc., or as intermediates in the preparation of other compounds. For example, alpha-phenyl glutaronitrile, by alcoholysis, yields esters which have valuable plasticizing properties for various resinous materials. Such products are also useful as intermediates for production of resins of the polyester and polyamide types.

This invention provides a practical method of preparing compounds for which no satisfactory source has heretofore been available. The classical method for preparation of such materials, employing the reaction of halogen compounds with alkali metal derivatives of active methylene compounds, requires expensive raw materials and procedures, and gives poor yields. Previously known methods of combining vinyl cyanide with compounds containing a reactive methylene group gave substantially complete formation of bis-addition products, with mono-addition occurring only as a minor side-reaction.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. The process which comprises reacting vinyl cyanide with a compound containing a reactive methylene group at a temperature between 150° C. and 250° C. in the presence of an alkaline catalyst.

2. The process which comprises reacting vinyl cyanide with benzyl cyanide with the latter being maintained in excess at a temperature between 150° C. and 250° C. in the presence of an alkaline catalyst.

3. The process which comprises reacting vinyl cyanide with an alkyl cyanoacetate with the latter being maintained in excess at a temperature between 150° C. and 250° C. in the presence of an alkaline catalyst.

4. The process which comprises reacting vinyl cyanide with ethyl cyanoacetate with the latter being maintained in excess at a temperature between 150° C. and 250° C. in the presence of an alkaline catalyst.

ARTHUR O. ROGERS.

REFERENCES CITED

The following references are of record in the file of this patent:

UNITED STATES PATENTS

| Number | Name | Date |
| --- | --- | --- |
| 1,992,615 | Hoffman et al. | Feb. 26, 1935 |
| 2,361,259 | Bruson | Oct. 24, 1944 |
| 2,381,371 | Shannon | Aug. 7, 1945 |
| 2,386,736 | Bruson | Oct. 9, 1945 |
| 2,393,000 | Seeger | Jan. 15, 1946 |
| 2,394,962 | Bruson | Feb. 12, 1946 |
| 2,396,626 | Wiest et al. | Mar. 12, 1946 |
| 2,401,429 | Kung | June 4, 1946 |
| 2,403,570 | Wiest | July 9, 1946 |
| 2,409,086 | Walker | Oct. 8, 1946 |

OTHER REFERENCES

Serial No. 404,150, Wulff et al. (A. P. C.), pub. Apr. 20, 1943.